US012308897B2

(12) United States Patent
Korosak

(10) Patent No.: US 12,308,897 B2
(45) Date of Patent: May 20, 2025

(54) ACTIVE DAMPING AND POWER CONTROL IN NFC ACTIVE LOAD MODULATION

(71) Applicant: STMicroelectronics Razvoj Polprevodnikov D.O.O., Ljubljana (SI)

(72) Inventor: Ziga Korosak, Mojstrana (SI)

(73) Assignee: STMicroelectronics Razvoj Polprevodnikov D.O.O., Ljubljana (SI)

( * ) Notice: Subject to any disclaimer, the term of this patent is extended or adjusted under 35 U.S.C. 154(b) by 0 days.

(21) Appl. No.: 18/298,914

(22) Filed: Apr. 11, 2023

(65) Prior Publication Data

US 2023/0344468 A1    Oct. 26, 2023

(30) Foreign Application Priority Data

Apr. 26, 2022  (EP) .................................... 22170024

(51) Int. Cl.
*H04B 5/45*    (2024.01)
*G06K 19/07*    (2006.01)

(52) U.S. Cl.
CPC ........... *H04B 5/45* (2024.01); *G06K 19/0723* (2013.01)

(58) Field of Classification Search
CPC ... H04B 5/40; H04B 5/45; H04B 5/72; H04B 5/77; H04W 52/383; H04W 4/80; H04L 25/4902; H03K 7/08; G06K 17/07; G06K 17/0723; G06K 19/07; G06K 19/0723
See application file for complete search history.

(56) References Cited

U.S. PATENT DOCUMENTS

| | | | | |
|---|---|---|---|---|
| 9,576,237 | B2 * | 2/2017 | Kunc ................. | G06K 19/0775 |
| 10,009,047 | B2 * | 6/2018 | Ruffieux ............ | G06K 19/0723 |
| 11,444,591 | B2 | 9/2022 | Kovacic et al. | |
| 2013/0003712 | A1 | 1/2013 | Kunc et al. | |
| 2015/0015862 | A1 | 1/2015 | Scholz | |
| 2018/0123843 | A1 * | 5/2018 | Teichmann ........ | G06K 19/0707 |

FOREIGN PATENT DOCUMENTS

| | | |
|---|---|---|
| EP | 2824512 A2 | 1/2015 |
| EP | 2824612 A1 | 1/2015 |
| EP | 3399655 A1 | 11/2018 |
| EP | 3512107 A1 | 7/2019 |
| WO | 2013002736 A1 | 1/2013 |

* cited by examiner

*Primary Examiner* — Betsy Deppe
(74) *Attorney, Agent, or Firm* — Slater Matsil, LLP

(57) ABSTRACT

A method for managing a signal transmission emitted by a wireless transponder to a reader is provided in which the signal transmission uses an active load modulation and includes transmitted bursts separated by pause periods. Each transmitted burst includes transmitted pulses. The method includes performing an active damping operation at the end of the transmitted bursts in the beginning of the pause periods, and the active damping operation includes transmitting a number of additional pulses having a phase opposite to the phase of the transmitted pulses. The transmitted pulses power, the additional pulses power, and the number of additional pulses are controlled based on a distance between the reader and the wireless transponder and on reference values of the transmitted pulses power, the additional pulses power, and the number respectively associated with reference distances.

22 Claims, 8 Drawing Sheets

ACTIVE DAMPING AND POWER CONTROL IN NFC ACTIVE LOAD MODULATION

CROSS-REFERENCE TO RELATED APPLICATIONS

This application claims priority to European Patent Application No. 22170024.8, filed on Apr. 26, 2022, which application is hereby incorporated herein by reference.

TECHNICAL FIELD

The present disclosure relates generally to wireless or contactless communication, and particular embodiments relate to a Near Field Communication (NFC).

BACKGROUND

In wireless systems, for example RFID or NFC systems, which use magnetic coupling, two different types of devices usually participate.

A reader is a device that transmits a magnetic field which carries data as well as power which is used by the other device (the transponder or tag) in the communication.

The other device (the tag) is usually passive and is thus entirely powered by the reader's magnetic field.

The tag usually communicates by load modulation of reader's magnetic field.

Alternatively, the tag can use active transmission to actively load modulate the reader's field.

Active load modulation (ALM) is "well-known" by the man skilled in the art.

Active transmit tag or transponder, using ALM, typically synchronize the frequency and phase of their internal frequency source to the frequency and phase of carrier signal emitted by the reader.

This is usually done using a phase locked loop (PLL).

The PLL locks to the signal received by the tag, which comes from the reader's magnetic field.

When the tag's own transmission starts, its own signal is much larger than the reader's signal.

Therefore, it becomes difficult to recognize the reader's signal to keep the PLL locked.

In conventional applications, the PLL is unlocked during this time.

However, with long transmission frames it becomes difficult to keep the PLL's phase constant in an unlocked state and so it may be preferable to resynchronize the PLL to the reader's signal during short transmission pauses.

But, because the tag's transmission signal is much larger than the reader's signal, during a short pause the amplitude of oscillation due to tag's own transmission signal may not decease enough for oscillation due to the reader's signal to become visible by the receiver (the tag).

Methods to dampen the tag's transmission signal oscillation on the antenna during these short pauses have been proposed, see e.g., EP2824612A1.

In some conditions, previously proposed solutions do not provide strong enough damping for the tag's receiver to be able to see the reader's signal during short transmission pauses.

Further, previously proposed solutions may require or otherwise rely on additional pins on the chip, which increases device size and cost.

SUMMARY

The present disclosure relates generally to wireless or contactless communication, and particular embodiments relate to a Near Field Communication (NFC), between a reader and a transponder, for example complying with RFID ("Radio Frequency Identification") and NFC ("Near Field Communication") standards, and more particularly to the damping and power control in NFC active load modulation.

The present disclosure provides various embodiments which facilitate a more efficient solution for damping a tag's transmission signal oscillation on an antenna during short transmission pauses.

According to an embodiment, a damping solution is provided which can be used standalone or in combination with previously proposed solutions.

According to an embodiment, a method of active damping the antenna oscillation due to the transmitted tag's signal is provided by transmitting with the opposite phase during the start of pause period.

In order to not induce oscillation of opposite phase on the antenna with the active damping operation, power output is advantageously controlled.

According to an embodiment, a digital-to time converter based phase modulator may be used to both perform the 180° phase change operation and perform power control by using outphasing (differential phase modulation).

Outphasing can also be used during normal transmission period to control transmitted power.

In an alternative implementation, an envelope shape control capable regulator can be used for power control.

When single ended antennas are used, a mixer may be advantageously implemented to convert outphased carriers to radio frequency (RF) pulse width modulated (PWM) signals.

The phase modulator may also perform common mode phase modulation to achieve a desired angle between transmitted and received signals.

In one or more embodiments, a method is provided for managing a signal transmission emitted by a wireless transponder to a reader.

In some embodiments, the signal transmission uses an active load modulation and includes transmitted bursts separated by pause periods.

In some embodiments, each transmitted burst includes transmitted pulses.

The method according to this aspect comprises performing an active damping operation at the end of the transmitted bursts in the beginning of the pause periods, the active damping operation comprising transmitting a number of additional pulses (also called "damping pulses") having a phase opposite to the phase of the transmitted pulses, and controlling the transmitted pulses power, the additional pulses power and the number of additional pulses based on a distance between the reader and the wireless transponder and on reference values of the transmitted pulses power, the additional pulses power, and the number respectively associated with reference distances.

The number of additional pulses may be varied in various embodiments based on application or design preferences. For example, an appropriate number of additional pulses may be determined depending on the application, and in particular on the characteristics of the antenna structure and matching circuit of the tag.

In some embodiments, the number of additional pulses is equal or smaller than three.

This number is not necessarily an integer.

According to an embodiment, controlling the transmitted pulses power, the additional pulses power, and the number of additional pulses comprises determining the distance between the tag and the reader and selecting the reference values associated to the closest reference distance to the determined distance.

For example, determining the distance may comprise measuring at the wireless transponder this distance by using the well-known Received Signal Strength Indicator (RSSI), i.e. the strength of the signal received at the wireless transponder.

Generally speaking, the wireless transponder is of a given model of wireless transponder.

And, according to an embodiment, the method further comprises elaborating the reference values of the transmitted pulses power, the additional pulses power and the number of damping pulses for a reference wireless transponder of the given model during a development phase of the reference wireless transponder, for example during a test phase of the reference wireless transponder in laboratory after its fabrication.

The elaborating comprises for example determining the reference values for each reference distance of a set of references distances by using a performance criterion.

More particularly, for a given reference distance, determining the associated reference values comprises selecting the reference values leading to the fulfilment of the performance criterion.

More particularly and according to an embodiment, the reference wireless transponder has a phase locked loop, the signal transmission includes frames transmission and the fulfilment of the performance criterion comprises an amplitude of the phase drift of the phase locked loop with respect to its initial phase during the transmission of a whole frame, being as low as possible, for example smaller than a threshold.

Although other possibilities can be used, controlling the transmitted pulses power, the additional pulses power comprises advantageously performing an outphasing of two phase modulated signals.

It is also possible, in particular with a single ended architecture of the transponder's antenna, that controlling the transmitted pulses power, the additional pulses power further comprises performing a mixing operation of both outphased signals to obtain pulse width modulated signals.

It is also possible to combine the above defined active damping with a passive damping, in particular a passive damping of the prior art.

Thus, according to an embodiment, the method further comprises performing a passive damping operation at the end of the transmitted bursts in the beginning of the pause periods, the passive damping operation comprising activating a connection of a resistive circuit to the antenna of the wireless transponder.

According to some embodiments, a wireless transponder is provided that includes
  a transmitter configured to transmit an active load modulated signal to a reader, the modulated signal including transmitted bursts separated by pause periods, each transmitted burst including transmitted pulses,
  a second transmitter (e.g., active damping circuitry) configured to transmit at the end of the transmitted bursts in the beginning of the pause periods, a number of additional pulses having a phase opposite to the phase of the transmitted pulses, and
  a controller configured to control the transmitted pulses power, the additional pulses power and the number of additional pulses based on a distance between the reader and the wireless transponder and on reference values of the transmitted pulses power, the additional pulses power, and the number respectively associated with reference distances.

According to an embodiment, the number of additional pulses is equal or smaller than three.

According to an embodiment the wireless transponder further comprises measurement circuitry configured to determine the distance between the wireless transponder and the reader. The controller is configured to control the transmitted pulses power, the additional pulses power, the number of additional pulses, by selecting for the determined distance, the reference values associated to the closest reference distance to the determined distance.

According to an embodiment, the wireless transponder is of a given model of wireless transponder, and the reference values of the transmitted pulses power, the additional pulses power and the number of additional pulses for a reference wireless transponder of the given model are elaborated during a development phase of the reference wireless transponder, for each reference distance of a set of references distances by using the fulfilment of a performance criterion.

According to an embodiment, the reference wireless transponder has a phase locked loop, and the fulfilment of the performance criterion comprises an amplitude of the phase drift of the phase locked loop with respect to its initial phase during the transmission of a whole frame, being smaller than a threshold.

According to an embodiment, the controller comprises a digital-to-time converter based phase modulator configured to control the transmitted pulses power and the additional pulses power by performing an outphasing of two phase modulated signals.

According to an embodiment, the controller further comprises a mixing circuit configured to perform a mixing operation of both outphased signals to obtain pulse width modulated signals.

According to an embodiment, the wireless transponder further comprises a controllable resistive circuit connected to the antenna of the wireless transponder and configured to perform a passive damping operation at the end of the transmitted bursts in the beginning of the pause periods.

According to an embodiment, the wireless transponder is configured to perform wireless communications according to at least one of the following standards: ISO14443 TypeA; ISO14443 TypeB; ISO15693. In this context, performance according to a standard means performance compatible with any version of the standard existing at the time of filing this patent.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
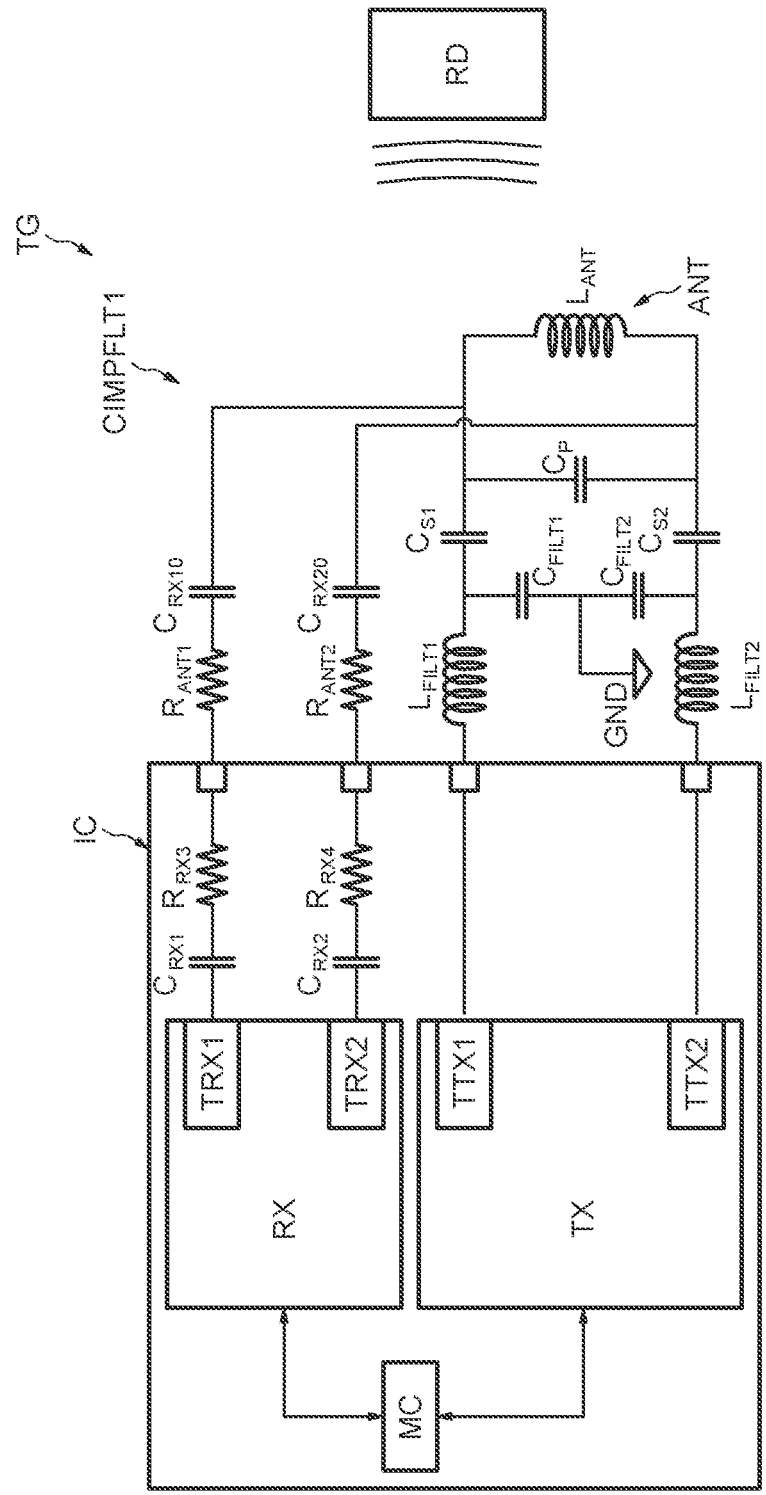
FIG. 1 is a schematic diagram illustrating a wireless transponder or tag TG included in an integrated circuit, in accordance with one or more embodiments.

FIG. 1 illustrates a wireless transponder or tag TG including an integrated circuit IC comprising transmitter TX and receiver RX, for example configured to perform wireless communications with a reader RD according to ISO14443 TypeA standard, and/or ISO14443 TypeB standard, and/or ISO15693 standard.

The tag TG uses active load modulation—ALM—for transmitting data to the reader RD.

The transmitter TX is configured to transmit frames including ALM carrier bursts to the reader RD through an antenna ANT.

The antenna comprises in particular an inductive element $L_{ANT}$.

The tag TG comprises also a conventional impedance matching and filtering circuit CIMPFLT1 connected between the antenna ANT and the terminals TTX1, TTX2, TRX1, TRX2 of the transmitter and the receiver.

The impedance matching and filtering circuit CIMPFLT1 comprises capacitors CP, CFILT1, CFILT2, CS1, CS2, CRX20, CRX10, CRX1, CRX2, inductive elements LFILT1, LFILT2 and resistors RRX3, RRX4, RANT1, RANT2.

The receiver RX includes a demodulation circuit coupled to a decoding circuit for receiving data from the reader RD through antenna ANT.

The decoding circuit provides data to a processing unit MC, for example a processor, which provides also data to be sent to the reader.

The data may be for example application data of a NFC (Near Field Communication) application such as transaction, payment, or any other suitable application.

A conventional circuit extracts from the signal received by the tag a clock signal having a frequency equal to the reader carrier frequency, which is for example equal to 13.56 MHz in ISO/IEC 14443.

The transmitter comprises a conventional encoder configured to perform here for example a Binary Phase Shift Keying (BPSK) data encoding.

The encoder provides a data modulating signal using a subcarrier (here a 847.5 KHz subcarrier) to a modulator (belonging to the transmission circuitry).

Figure 2:
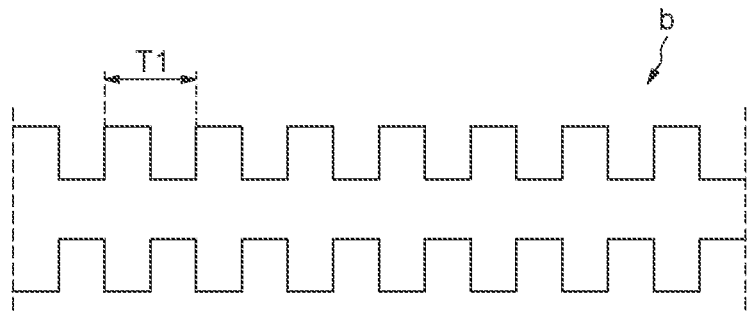
FIG. 2 is a diagram illustrating one bit period of a bit to be transmitted, in accordance with one or more embodiments.

As illustrated in FIG. 2, one bit period of a bit b to be transmitted to the reader contains 8 subcarrier periods T1.

The logical value of the bit b depends on the state high or low of the beginning of the bit period. For example, a bit period beginning with a high state and finishing with a low state may be considered as being a logical "1" whereas a bit period beginning with a low state and finishing with a high state may be considered as being a logical "0". Of course, this convention could be inverted.

Figure 3:
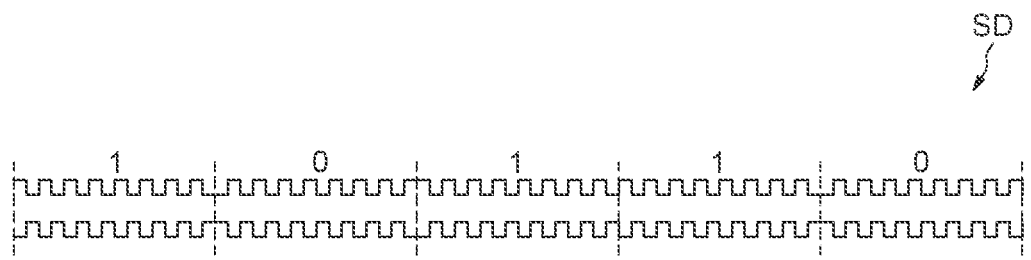
FIG. 3 is a diagram illustrating an example of a series of bits in a data modulating signal, in accordance with one or more embodiments.

FIG. 3 illustrates an example of a series of bits 1, 0, 1, 0 contained in the data modulating signal SD provided by the encoder.

The modulator receives the data modulating signal SD as well as an ALM clock signal, which in some embodiments may be advantageously provided by a digital phase locked loop (DPLL).

The modulator is configured to perform a subcarrier modulation with the data encoding for generating a signal STX to antenna ANT.

Figure 4:
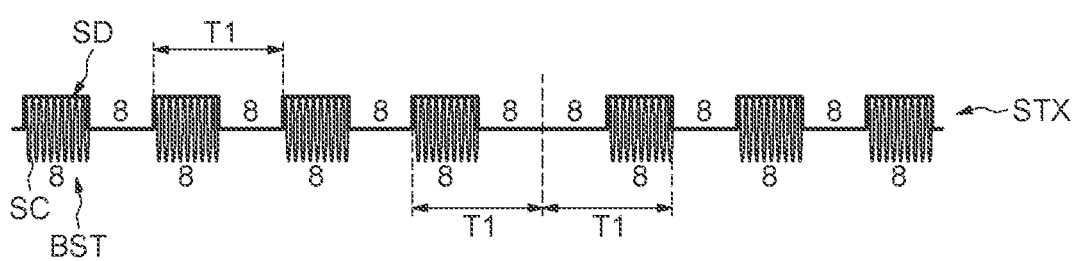
FIG. 4 is a diagram illustrating a signal generated by modulation circuitry, in accordance with one or more embodiments.

This signal STX comprises, as illustrated in FIG. 4, bursts BST of ALM carrier SC (the ALM carrier SC having a frequency equal here to 13.56 MHz).

Two consecutive bursts BST are separated by a gap or pause period wherein no signal is transmitted from the transponder to the reader.

Each half period of the subcarrier period T1 during which there is a signal transmission contains 8 periods of the carrier signal SC.

Figure 5:
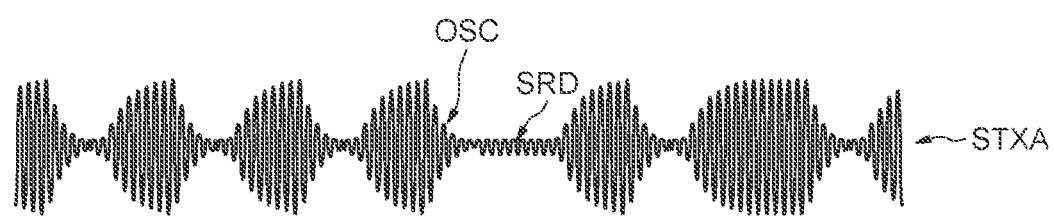
FIG. 5 is a diagram illustrating a tag's transmission signal, in accordance with one or more embodiments.

The signal STX and the corresponding signal STXA at the antenna of the tag are illustrated in FIG. 5. The signal SRD corresponds to the oscillation of the reader carrier signal present on the antenna of the tag TG.

As illustrated in this FIG. 5, each generation of ALM carrier burst BST produces after the generation, signal oscillation OSC at the antenna which naturally decays due to the quality factor of the antenna.

However, because the tag's transmission signal STXA is much larger than the oscillation of the reader's signal SRD, during a short pause, the amplitude of oscillation OSC due to the tag's own transmission signal STXA may not decease enough for oscillation due to reader's signal SRD to become visible by the tag.

Thus, in some embodiments, an active damping of the antenna oscillation is performed by transmitting with the opposite phase of antenna oscillation OSC during the start of pause period, e.g., by transmitting pulses with reverse angle compared to an antenna oscillation angle to damp the antenna oscillations.

More particularly, as indicated above, bursts BST of ALM carrier SC are transmitted by the tag, separated by gaps or pause periods.

Those bursts of ALM carrier SC are based on transmission (generation) of bursts of pulses, called transmitted pulses. Those bursts of transmitted pulses are separated by the pause periods.

And the active damping is performed at the end of the transmitted bursts in the beginning of the pause periods, and comprises, generally speaking, transmitting a number of additional pulses (also called damping pulses) having a phase opposite to the phase of the transmitted pulses.

Further, in order to avoid as much as possible inducing oscillation of opposite phase on the tag's antenna, the output power of signal delivered during this active damping, i.e. the additional pulses power, is advantageously controlled.

Figure 6:
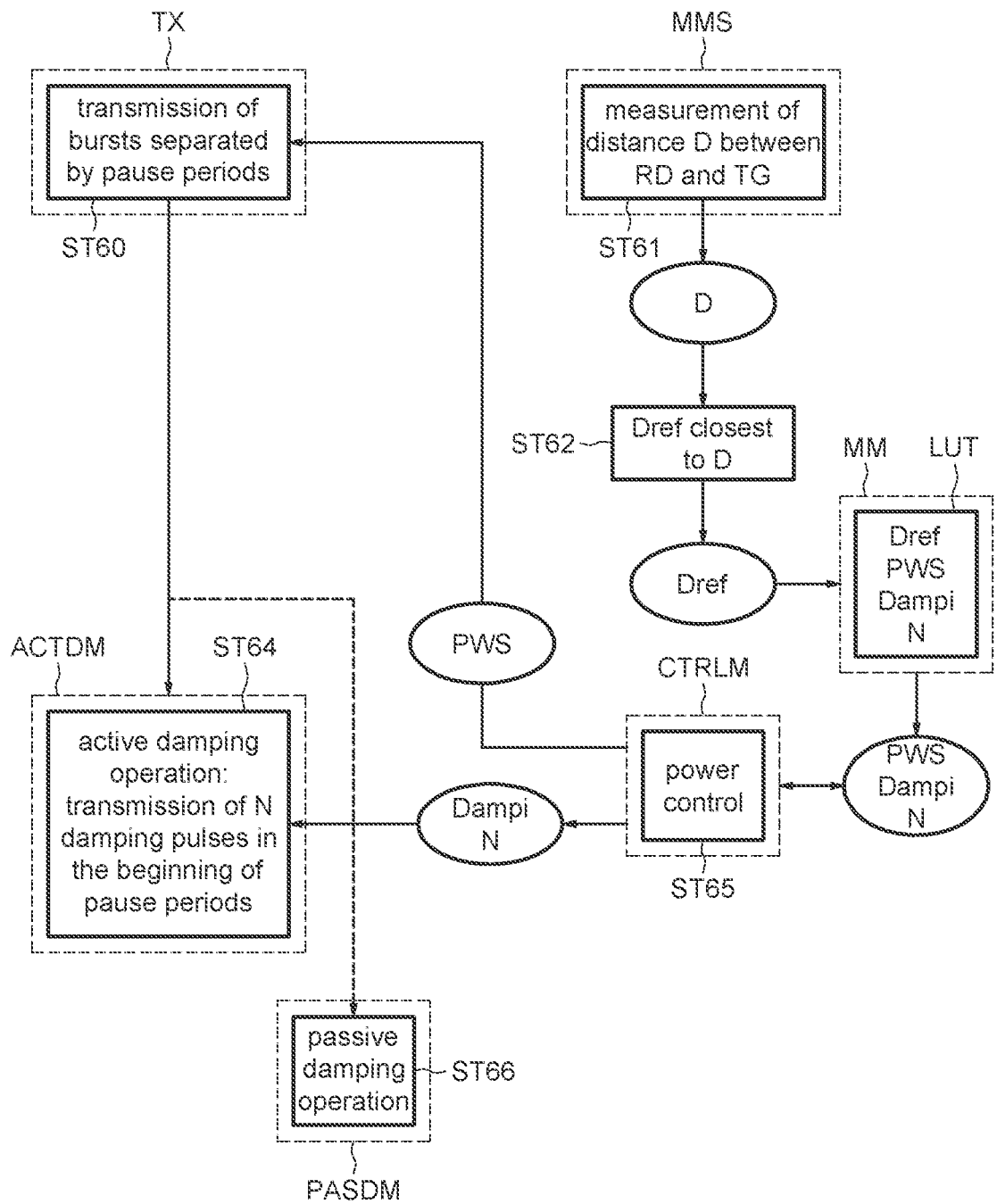
FIG. 6 is a diagram illustrating a method for managing a signal transmission emitted by a wireless transponder to a reader, in accordance with one or more embodiments.

An example of a method according to the disclosure is more particularly disclosed with reference to FIG. 6.

In step ST60, the bursts of pulses are transmitted and are separated by pause periods.

In step ST61, the distance D between the reader RD and the tag TG is measured by measurement circuitry MMS.

Those measurement circuitry MMS, incorporated for example in the reception circuitry RX, can be implemented by any suitable circuitry, and in some embodiments, may be performed by conventional circuitry configured to measure the distance D by using for example the RSSI of the signal received by the tag at its antenna.

The distance D may be determined or measured based on the RSSI by any suitable technique, including, for example, a known mathematical formula used to determine the distance D from the RSSI.

The tag TG comprises also a memory MM storing a look-up table LUT.

This look-up table LUT includes reference values of the transmitted pulses power PWS, reference values of the additional pulses power Dampi, the number N of damping pulses, and, all these reference values as well as the number N are associated with reference distances Dref between the reader and the tag.

The way of how those reference values associated with the reference distances are determined will be explained more in detail thereafter.

After the distance D has been determined by the measurement circuitry MMS in step ST61, the reference distance Dref closest to distance D is determined in step ST62.

And, with this determined reference distance Dref, the transmitted pulse power PWS, the damping pulse power Dampi and the number of damping pulses N, associated to this determined reference distance Dref, are extracted from memory MM.

In step ST64, the above-mentioned active damping operation is performed by active damping circuitry ACTDM.

More particularly, as indicated above, this active damping operation comprises a transmission of the N damping pulses in the beginning of pause periods.

And, in step ST65, controller CTRLM perform a power control of the transmitted pulses by using the power setting PWS and a control of the damping pulse power by using the extracted value Dampi.

The controller CTRLM define also the number N of damping pulses based on the number extracted from the loop up table LUT.

Depending on the application, it could be also useful to perform, for example simultaneously with the active damping operation, a passive damping operation ST66.

This passive damping operation, performed by passive damping circuitry PASDM, will be explained more in detail thereafter.

Figure 7:
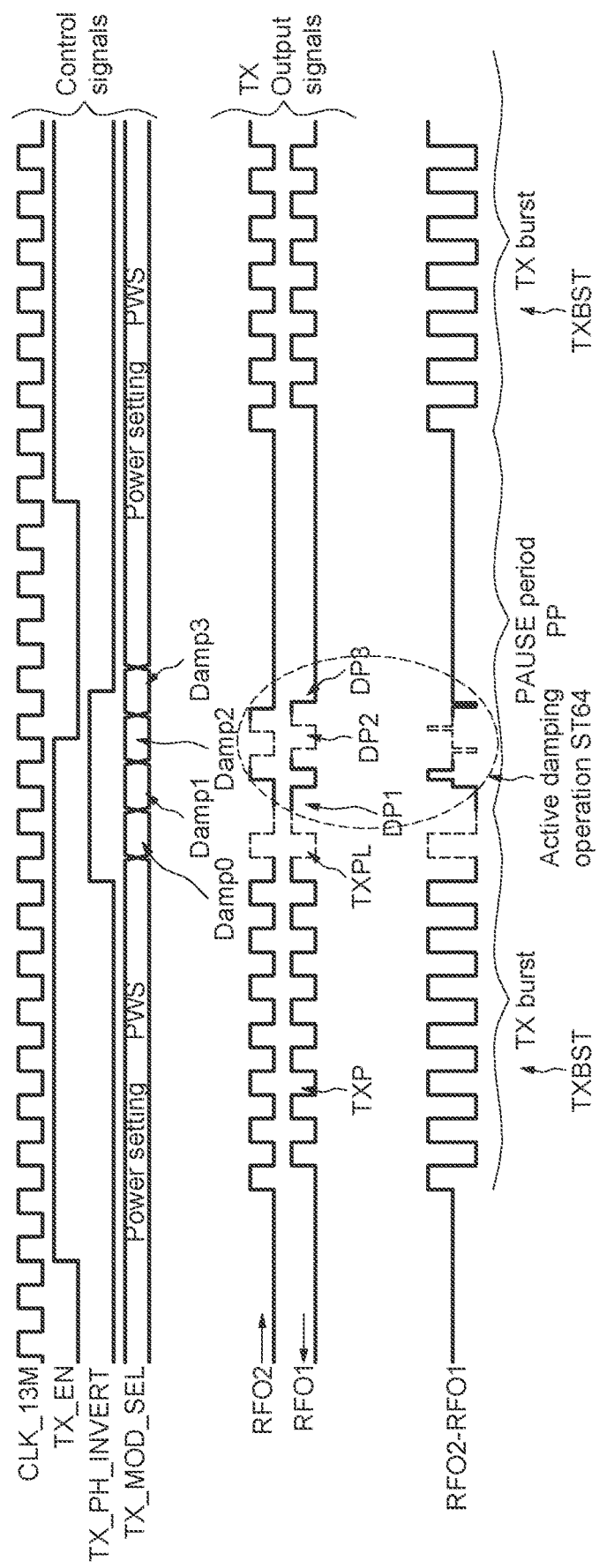
FIG. 7 is a diagram illustrating a chronogram showing an active dumping operation, in accordance with one or more embodiments.

We refer now more particularly to FIG. 7 which illustrates diagrammatically a chronogram showing the active dumping operation ST64.

This example shows BPSK coding example for ISO14443 type B 847.5 Kbits/s communication from the tag to the reader.

Of course, other types of coding are possible, such as the Manchester coding, and any suitable coding type, protocol, or the like may be implemented in various embodiments.

This example corresponds also to a differential AND or basic mode. As it will be explained more in detail thereafter, the tag comprises a driver stage including two drivers respectively connected to the two terminals TTX1 and TTX2. The terms differential and full differential refer purely to the driver idle state. A differential state corresponds to the same state of the two drivers while the two drivers may operate differentially during transmission. A fully differential state corresponds to the fact that the two drivers are in a differential state even when idle.

AND mode, XOR mode, 3-Phase mode, correspond to different transmission modes which may be implemented in accordance with various embodiments.

All those three types of transmission modes can be used with differential or fully differential state, and are compatible with the active damping of embodiments of the present disclosure.

The control signals are illustrated in the top part of FIG. 7.

More particularly, CLK_13M is an ALM clock having a frequency of 13.56 MHz.

TX_EN is the control signal activating or not the transmission of the tag's signal.

TX_PH_INVERT is a logical signal triggering the phase inversion of the pulse(s).

TX_MOD_SEL is the digital control word controlling the power settings PWS and Dampi. Here, 4 possible values of Dampi are possible, Damp0, Damp1, Damp2, and Damp3.

The bottom part of FIG. 7 illustrates the (TX transmission) output signals.

More particularly, RFO2 is the output signal present at terminal TTX2 while RFO1 is the output signal present at terminal TTX1.

Arrows next to the references RFO1 and RFO2 show the direction of phase change.

And, RFO2–RFO1 is the difference between the two mentioned signals RFO2 and RFO1.

Reference TXBST designates the transmitted bursts including the transmitted pulses TXP. As indicated above, the transmitted bursts TXBST are separated by pause periods PP.

Reference TXPL designates the last transmitted pulse (in dotted line) of the burst TXBST.

And, as shown in this FIG. 7, after the last transmitted pulse TXPL, the damping pulses are transmitted in the beginning of the pause period PP.

Here, the number N of damping pulses is equal to 2.5.

More generally, the number of damping pulses transmitted may in some embodiments be up to 3, however embodiments are not limited thereto. When the driver is in differential AND mode such as illustrated in FIG. 7, the possible number of damping pulses is 0, 0.5, 1.5 and 2.5.

The half pulses come from the fact that both drivers have to park in the same state as the differential mode requires.

If fully differential AND mode is used, the possible number of pulses are 0, 1, 2 or 3. Again, this difference comes from the nature of differential state and fully differential state.

In the present example, the first damping pulse (in full line) is referenced DP1, the second damping pulse (in dotted line) is referenced DP2 and the last half damping pulse (in full line) is referenced DP3.

The power setting for the first damping pulse DP1 is Damp1, the power setting for the second damping pulse is Damp2 and the power setting for the last half pulse is Damp3.

The number of damp settings Dampi may, in some embodiments, be one higher than the number of damping pulses in order to have more flexibility.

It is also possible, as illustrated in this example, to adjust the timing of the power setting Damp0 so that it can affect the first damp pulse DP1 leading thus to having Damp3 redundant.

It is also possible to reduce the power of the last half of the last transmitted pulse TXPL by using Damp0 instead of PWS.

Figure 8:
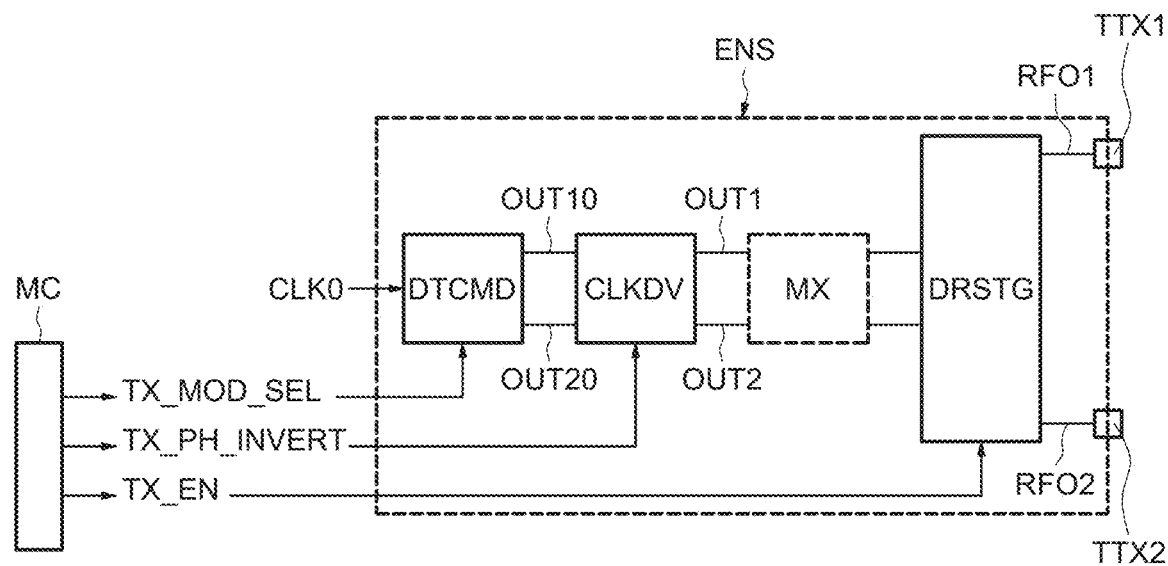
FIG. 8 is a diagram illustrating active damping and control circuitry, in accordance with one or more embodiments.

We refer now more particularly to FIG. 8 which illustrates diagrammatically a group ENS of elements forming in particular the active damping circuitry ACTDM and the controller CTRML, which may be coupled to the transmission circuitry TX or included as part of the transmission circuitry TX in accordance with one or more embodiments. For example, as shown in FIG. 8, the active damping circuitry ACTDM and the control circuitry CTRML may be electrically coupled to the terminals TTX1 and TTX2 of the transmission circuitry.

The first element is a digital-to-time converter based phase modulator DTCMD receiving an initial clock signal CLK0 having here a frequency equal to 54.24 MHz.

The DTC based phase modulator DTCMD is controlled by the control signal TX_MOD_SEL.

The DTC modulator DTCMD delivers two signals OUT10 and OUT20 having the frequency equal to 54.24 MHz, the phase difference between these two signals being controlled by the control signal TX_MOD_SEL.

The two signals OUT10 and OUT20 are delivered to a clock divider and +/−180° modulator CLKDV which delivers two signals OUT1 and OUT2 having the frequency equal to the ALM frequency (here 13.56 MHz).

This element CLKDV is controlled by the control signal TX_PH_INVERT.

Of course, if the frequency of the initial clock signal CLK0 is equal to 13.56 MHz, the element CLKDV does not include a frequency divider but include nevertheless the +/−180° modulator.

And, optional mixing stage MX receives the two signals OUT1 and OUT2. This mixing stage MX is optional. For example, in some embodiments, the mixing stage MX may be omitted if the antenna of the tag is a differential antenna, and in some embodiments, the mixing stage MX may be included if the antenna is a single ended antenna.

At last, a driving stage DRSTG is connected to the output of the mixing circuit and includes in particular the two above mentioned drivers respectively connected to the terminals TTX1 and TTX2. This driving stage DRSTG is controlled by the control signal TX_EN and delivers the two signals RFO1 and RFO2.

The control signals TX_MOD_SEL, TX_PH_INVERT and TX_EN are delivered by the processing unit MC.

Any internal conventional structure of a DTC based phase modulator may be used.

For example, the DTC based phase modulator DTCMD may include a tapped delay locked loop with 64 taps to allow 64 differential output states with 560 picosecond phase differences between them. Differential output states are achieved by using 2 taps and 64 output states are achieved by the same two outputs in reverse and non-reverse state for every combination of 2.

Every output has modulation range of 360°. Modulation is performed by switching between output taps to change clock phase by using the control word TX_MOD_SEL.

For example, the maximum value of the word TX_MOD_SEL generates OUT10 and OUT20 with angles of 0° and 360° which translates into OUT1 and OUT2 having angles of 0° and 180° which in turn gives maximum power. If the mixing stage is used, this provides full pulse with PWM.

When value of TX_MOD_SEL decreases, the angles of OUT1 and OUT2 both move towards 90°. At the minimum value 0 of the control word TX_MOD_SEL, the transmitted power is 0, and if mixing is used, the resulting pulse width is also 0.

Here, the DTC modulator DTCMD operates at 4 times the carrier frequency and therefore it has to modulate the carriers for 4 times the angle to get the proper angle after frequency division.

Thus, this outphasing operation permits to control the power of the transmitted pulses and the power of the damping pulses.

Figure 9:
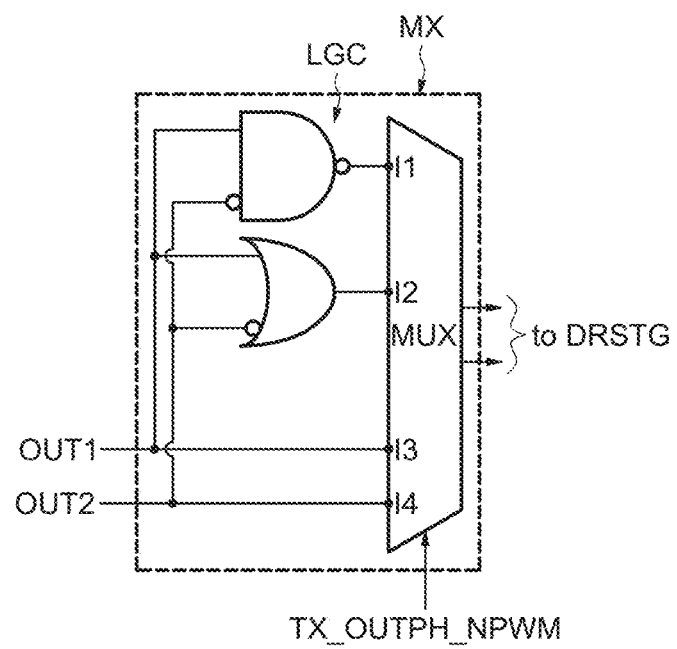
FIG. 9 is a diagram illustrating a mixing circuit, in accordance with one or more embodiments.

We refer now to FIG. 9 which illustrates diagrammatically an embodiment of a mixing circuit MX.

This mixing circuit comprises a multiplexor MUX having a first input I1, a second input I2, a third input I3, and a fourth input I4 as well as two outputs connected to the driver's stage DRSTG.

The first input and the second input I1, I2, are connected to a logical circuit LGC including a NAND gate and an OR gate.

The logical circuit LGC is intended to receive the two signals OUT1 and OUT2.

The third input I3 and the fourth input I4 of the multiplexor MUX receive directly the two signals OUT1 and OUT2.

The multiplexor MUX is controlled by a control signal TX_OUTPH_NPWM delivered by the processing unit MC.

Depending on the value of this control signal, the two outputs of the multiplexor are either connected to the logical circuit or directly to element CLKDV.

If the output of the multiplexor is connected to the first input I1 and second input I2, a radiofrequency pulse-width modulation operation is performed.

If the outputs of the multiplexor are connected to third and fourth inputs I3 and I4, no mixing operation is performed.

Figure 10:
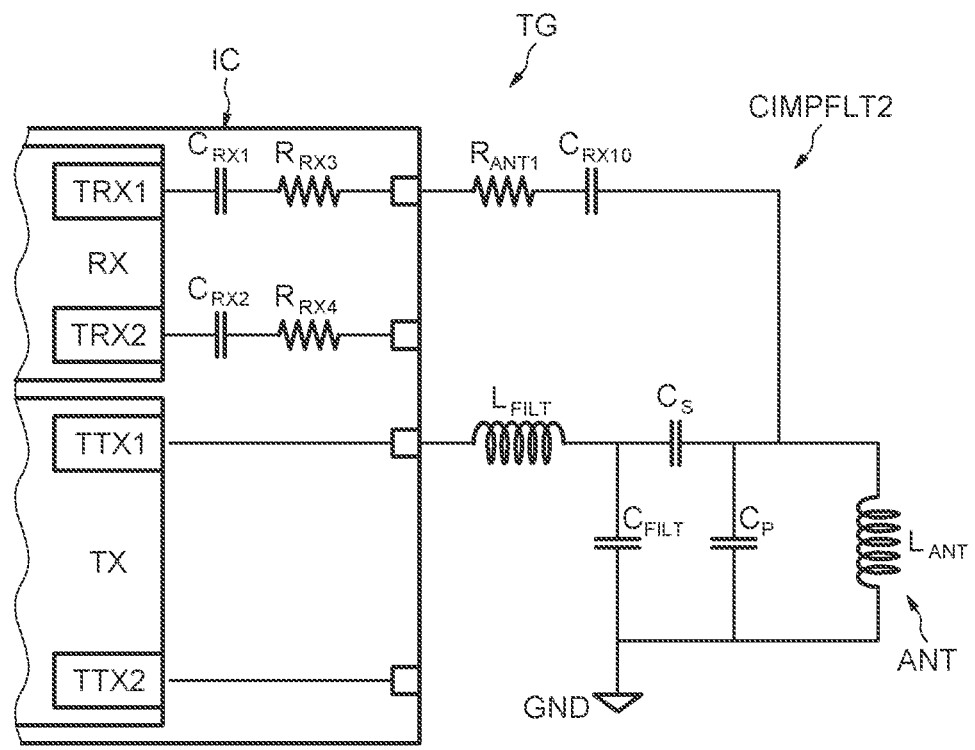
FIG. 10 is a diagram illustrating impedance matching and filtering circuitry, in accordance with one or more embodiments.

While the outphasing operation is advantageously used when the antenna is a differential antenna, to control the damping pulses power and also advantageously the transmitted pulses power, outphasing operation cannot be used when a single antenna is used as illustrated in FIG. 10. In such a configuration, the impedance matching and filtering circuit CIMPFLT2 is connected only to terminals TRX1, and TTX1.

In such a case, the mixing circuit is actually implemented to convert the outphased carriers OUT1 and OUT2 to RF PWM signals, because the signals cannot be mixed on the antenna.

Figure 11:
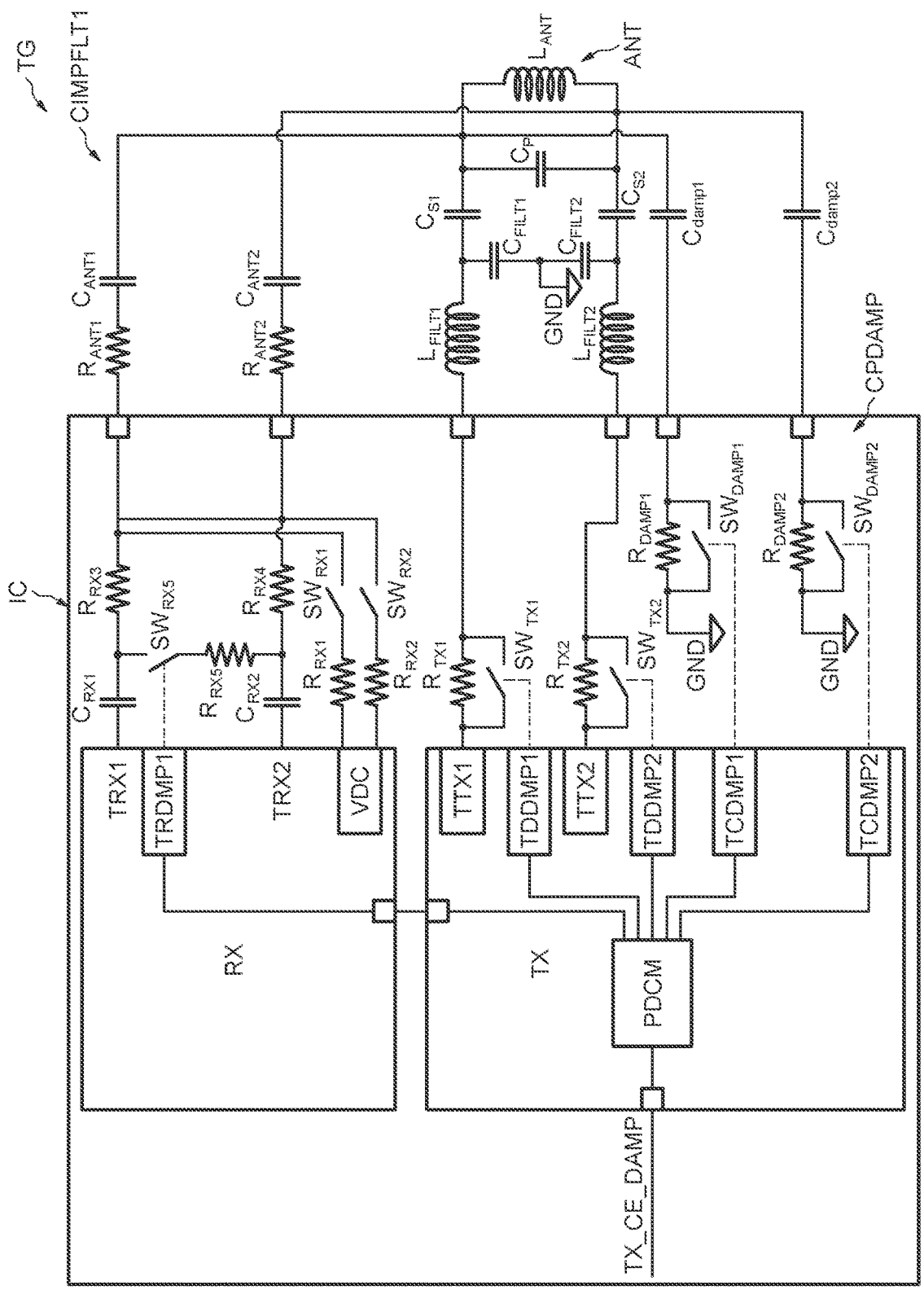
FIG. 11 is a diagram illustrating a controllable resistive circuit, in accordance with one or more embodiments.

Although the active damping operation may be used standalone, it could be useful, in some applications, to combine the active damping operation with a passive damping operation by using a controllable resistive circuit CPDAMP, as illustrated in FIG. 11, connected to the antenna ANT of the tag and configured to perform a passive damping operation at the end of the transmitted burst in the beginning of the pause period.

Such a resistive circuit CPDAMP comprises damping resistors $R_{TX1}$, $R_{TX2}$, $R_{DAMP1}$, $R_{DAMP2}$, and $R_{RX5}$ controlled by switches $SW_{TX1}$, $SW_{TX2}$, $SW_{DAMP1}$, $SW_{DAMP2}$, and $SW_{RX5}$.

Those switches are connected to terminals TDDMP1, TDDMP2, TCDMP1, and TCDMP2 of the transmitter TX and to the terminal TRDMP1 of the receiver RX.

A control signal TX_CE_DAMP, delivered by the processing unit MC can activate a passive damping control circuitry TDCM for controlling the switches.

Switches $SW_{RX1}$ and $SW_{RX2}$ are controlled statically by an option bit and are not changed during the duration of the TX frame.

VDC is a voltage source.

The damping circuits CPDAMP may be any suitable circuits, including, for example conventional or known damping circuits. One example of a damping circuit is disclosed in EP2824512A1, which is incorporated herein by reference.

Figure 12:
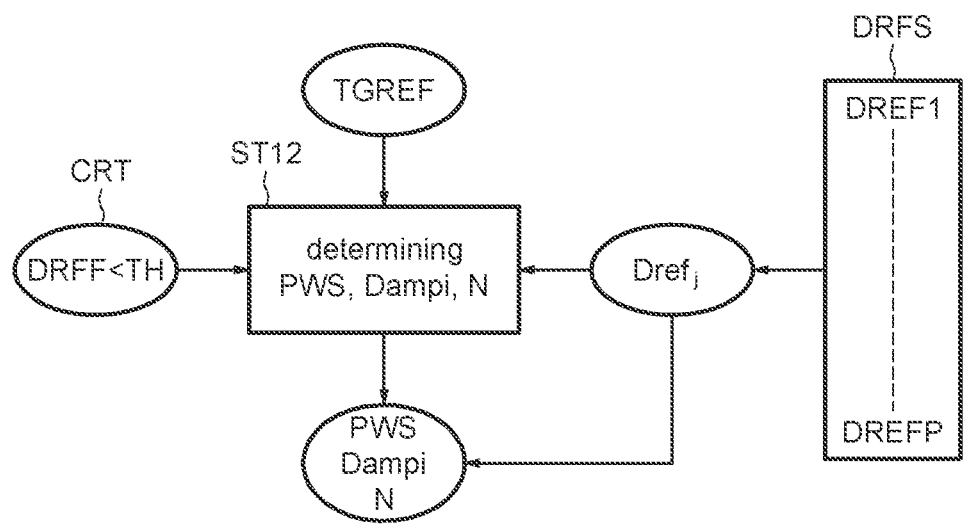
FIG. 12 is a diagram illustrating how the lookup table containing reference values can be determined, in accordance with one or more embodiments.

We refer now more particularly to FIG. 12 to explain how the lookup table LUT containing reference values can be determined.

In fact, the wireless transponder TG is of a given model of wireless transponder, for example, which may belong to a family of transponders having the same characteristics, in particular concerning the antenna and the matching and filtering circuit.

The reference values of the transmitted pulses power, the reference values of the additional or damping pulses power as well as the number of damping pulses are determined for the reference tag TGREF during a development phase of this reference tag. And the reference values as well as the number N is determined for each reference distance DREFj of a set DREFS of reference distances DREF1-DREFP by using a performance criterion CRT.

More particularly, for example, the performance criterion is the phase drift of the phase locked loop (PLL) of the reference tag from the initial phase.

As a matter of fact, before the tag starts active mode modulation, it has to lock its PLL to the phase of the received signal.

And once the tag starts transmitting, the received signal is corrupted by transmitting signal. In order to mitigate this issue, damping is used. The effectiveness of damping is determined by how clearly the reader signal phase can be determined during transmission.

Because damping is not ideal, there will be some phase drift of the PLL during transmission of a whole frame.

The amplitude of this phase drift is the criterion.

More particularly, for each reference distance DREFj, the power setting PWS, the power setting Dampi and the number N of damping pulses are determined so that the amplitude of this phase drift DRFF during transmission of a whole frame is as low as possible, and practically smaller than a threshold TH, which can be equal for example to 20°.

In other words, in this non limitative example, the power setting PWS, the power setting Dampi and the number N of damping pulses are determined so that the amplitude of this phase drift DRFF is smaller than 200 during the transmission of the whole frame.

Thus, reference value PWS DAMPi and N can be determined and associated to the reference distance DREFj.

The disclosure is not limited to the above disclosed embodiments.

In an alternative implementation, a simple phase modulator can be used, capable of only +/−180° changes, in conjunction with an envelope shape control, which may be or include any known or conventional envelop shape control, to control the power output during the damping operation.

What is claimed is:

1. A method for managing a signal transmission emitted by a wireless transponder to a reader, the transmission using an active load modulation and being based on transmitted bursts separated by pause periods, each transmitted burst including transmitted pulses, the method comprising:

performing an active damping operation at an end of the transmitted bursts in a beginning of the pause periods, the active damping operation including transmitting a number of additional pulses having a phase opposite to a phase of the transmitted pulses; and controlling the transmitted pulses' power, the additional pulses' power, and the number of additional pulses based on a distance between the reader and the wireless transponder and on reference values of the transmitted pulses' power, the additional pulses' power, and the number respectively associated with reference distances.

2. The method according to claim 1, wherein the number of additional pulses is equal to or smaller than three.

3. The method according to claim 1, wherein controlling the transmitted pulses' power, the additional pulses' power, and the number of additional pulses comprises determining the distance and selecting the reference values associated with a closest reference distance to the determined distance.

4. The method according to claim 1, wherein the wireless transponder is of a given model of wireless transponder, and the method further comprises elaborating the reference values of the transmitted pulses' power, the additional pulses' power and the number of additional pulses during a development phase of a reference wireless transponder of the given model, the elaborating comprising:

determining the reference values for each reference distance of a set of references distances by using a performance criterion.

5. The method according to claim 4, wherein for a given reference distance, determining the associated reference values comprises selecting the reference values leading to the fulfilment of the performance criterion.

6. The method according to claim 5, wherein the reference wireless transponder includes a phase locked loop, the signal transmission includes frames transmission and the fulfilment of the performance criterion comprises an amplitude of a phase drift of the phase locked loop with respect to its initial phase during the transmission of a whole frame, being smaller than a threshold.

7. The method according to claim 1, wherein controlling the transmitted pulses' power and the additional pulses' power comprises performing an outphasing of two phase modulated signals.

8. The method according to claim 7, wherein controlling the transmitted pulses' power and the additional pulses' power further comprises performing a mixing operation of the two outphased signals to obtain pulse width modulated signals.

9. The method according to claim 1, further comprising performing a passive damping operation at the end of the transmitted bursts in the beginning of the pause periods, the passive damping operation comprising activating a connection of at least a resistive circuit to an antenna of the wireless transponder.

10. A wireless transponder comprising:

a first transmitter configured to transmit an active load modulated signal to a reader, the modulated signal including transmitted bursts separated by pause periods, each transmitted burst including transmitted pulses;

a second transmitter configured to transmit a number of additional pulses having a phase opposite to a phase of the transmitted pulses, the additional pulses being transmitted after the transmitted bursts and before the pause periods; and a controller configured to control the transmitted pulses' power, the additional pulses' power, and the number of additional pulses based on a distance between the reader and the wireless transponder and on reference values of the transmitted pulses' power, the additional pulses' power, and the number respectively associated with reference distances.

11. The wireless transponder according to claim 10, wherein the number of additional pulses is equal to or smaller than three.

12. The wireless transponder according to claim 10, further comprising measurement circuitry configured to determine the distance between the wireless transponder and the reader, wherein the controller is configured to control the transmitted-pulses' power, the additional pulses' power, and the number of additional pulses, by selecting for the determined distance, the reference values associated with a closest reference distance to the determined distance.

13. The wireless transponder according to claim 10, wherein the wireless transponder is of a given model of wireless transponder, and the reference values of the transmitted pulses' power, and the additional pulses' power are elaborated during a development phase of a reference wireless transponder of the given model for each reference distance of a set of references distances based on fulfilment of a performance criterion.

14. The wireless transponder according to claim 13, wherein the reference wireless transponder includes a phase locked loop, and the fulfilment of the performance criterion comprises an amplitude of a phase drift of the phase locked loop with respect to its initial phase during the transmission of a whole frame, being smaller than a threshold.

15. The wireless transponder according to claim 10, wherein the controller comprises a digital-to-time converter based phase modulator configured to control the transmitted pulses' power and the additional pulses' power by performing an outphasing of two phase modulated signals.

16. The wireless transponder according to claim 15, wherein the controller further comprises a mixer circuit configured to perform a mixing operation of the two outphased signals to obtain pulse width modulated signals.

17. The wireless transponder according to claim 10, further comprising a controllable resistive circuit connected to an antenna of the wireless transponder and configured to perform a passive damping operation at an end of the transmitted bursts in a beginning of the pause periods.

18. The wireless transponder according to claim 10, configured to perform wireless communications according to at least one of the following standards: ISO14443 TypeA; ISO14443 TypeB; and ISO15693.

19. The wireless transponder according to claim 10, wherein the controller is part of the second transmitter.

20. The wireless transponder according to claim 10, wherein the controller is coupled to the second transmitter.

21. A device comprising:
transmission circuitry configured to transmit a modulated signal to a reader, the modulated signal including a first group of pulses and a second group of pulses, the first and second groups of pulses separated from one another by a pause period;
active damping circuitry configured to transmit, during the pause period, damping pulses having a phase different than a phase of the pulses of the first group and the second group; and
control circuitry configured to control the power of the pulses of the first group and the second group, and the power of the damping pulses power, based on a distance between the reader and the device and on reference values associated with the power of the pulses of the first group and the second group and the power of the damping pulses.

22. The device according to claim 21, wherein the control circuitry is configured to control a number of the damping pulses based on the distance between the reader and the device.

* * * * *

UNITED STATES PATENT AND TRADEMARK OFFICE
CERTIFICATE OF CORRECTION

| | | |
|---|---|---|
| PATENT NO. | : 12,308,897 B2 | Page 1 of 1 |
| APPLICATION NO. | : 18/298914 | |
| DATED | : May 20, 2025 | |
| INVENTOR(S) | : Ziga Korosak | |

It is certified that error appears in the above-identified patent and that said Letters Patent is hereby corrected as shown below:

In the Claims

In Column 14, Line 29, Claim 21:
Change "power of the damping pulses power, based on a distance"
To --power of the damping pulses, based on a distance--

Signed and Sealed this
Twenty-fourth Day of June, 2025

Coke Morgan Stewart
*Acting Director of the United States Patent and Trademark Office*